March 4, 1969    J. C. FREEBORN    3,431,459
SPIRAL SWEEP PHASE SHIFT COMPENSATION
Filed March 31, 1967    Sheet _1_ of 2

INVENTOR.
John C. Freeborn
BY John F. Miller
John M. ─────
ATTORNEY

United States Patent Office 3,431,459
Patented Mar. 4, 1969

3,431,459
SPIRAL SWEEP PHASE SHIFT COMPENSATION
John C. Freeborn, West Covina, Calif., assignor, by mesne assignments, to the United States of America
Filed Mar. 31, 1967, Ser. No. 628,242
U.S. Cl. 315—24      9 Claims
Int. Cl. H01j 29/70

ABSTRACT OF THE DISCLOSURE

An apparatus for synchronizing sweep circuitry with beam intensifying circuitry in a cathode ray tube display system.

Background of the invention

In sonar, radar, and similar apparatus using spiral sweep cathode ray tube displays any phase drift between the sweep circuitry and beam intensifying circuitry results in an inaccurate display. This invention avoids the problem of phase drift with a novel synchronizing circuit.

Summary of the invention

An improved apparatus for synchronizing beam intensifying circuitry with the sweep circuitry of a spiral sweep cathode ray tube display used in, for example, sonar and radar installations. Synchronization is effected by using an output of the sweep circuit to generate a reference pulse for controlling the beam intensifying circuit through a bearing counter. This accomplishes an object of the invention by avoiding the inaccurate displays caused by phase drift between the sweep deflection generator circuitry and the beam intensifying circuitry of the prior art.

Description of the preferred embodiment

Figure 1:
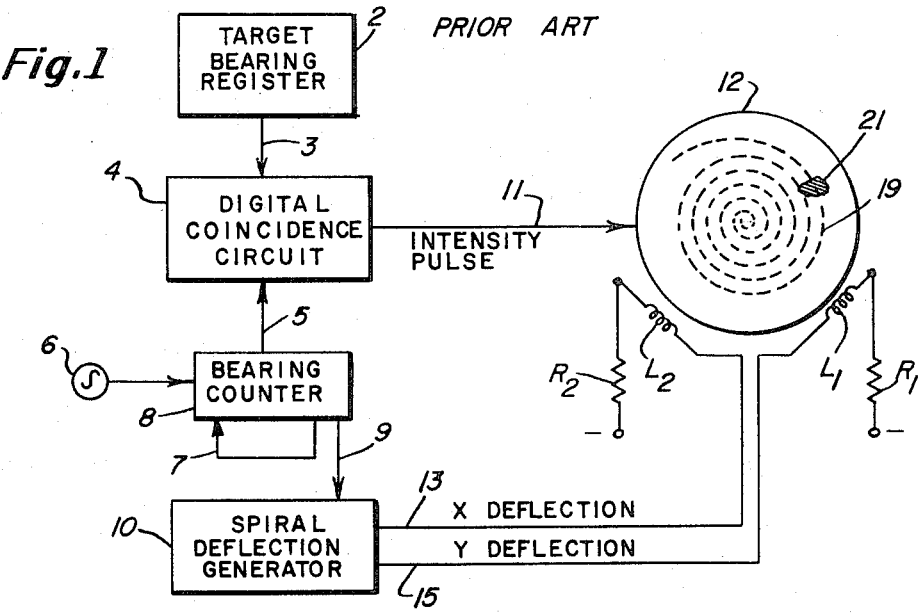
FIG. 1 shows a prior art system.

In the prior art sonar apparatus shown in FIG. 1, a number is accumulated in a target bearing register 2 as a function of the bearing of a target. A clock pulse source 6 feeds a bearing counter 8 which resets over line 7 on reaching a convenient count, e.g. 3600. Target bearing register 2 and bearing counter 8 are connected to a digital coincidence circuit 4 by output lines 3 and 5 respectively so that when the two numbers accumulated in register 2 and counter 8 are digitally coincident, circuit 4 sends a cathode beam intensifying pulse over output line 11 to a cathode ray tube display 12. A spiral deflection voltage generator 10 is synchronized by a 150 c.p.s. output on line 9 from bearing counter 8 so that X and Y deflection voltages on output lines 13 and 15 connected to deflection windings L1 and L2 tube 12 cause the electron beam from the cathode to periodically scan the face of tube 12 in a spiral path 19. When tube 12 receives a beam intensifying pulse from circuit 4 the electron beam has theoretically been swept by the X and Y deflection voltages to a position shown as a brightened spot 21 on the face of the tube which is indicative of the position of the target which occasioned the beam intensifying pulse. However, in practice, phase drift between the circuits can result in an inaccurate display.

Figure 2:
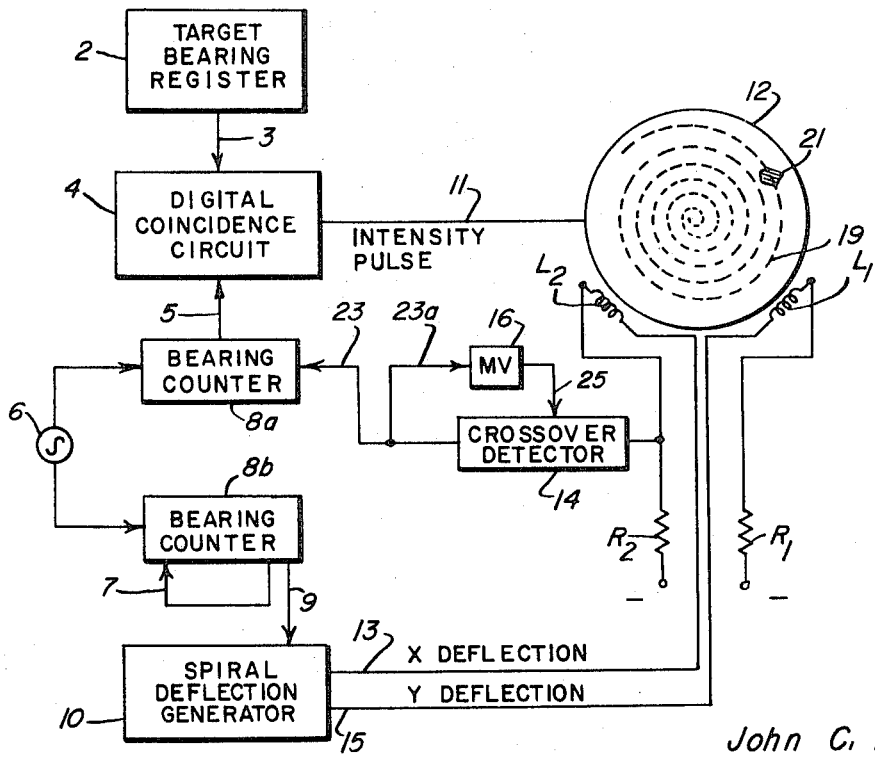
FIG. 2 is a block diagram of the apparatus of the invention.

The circuit of this invention shown in FIG. 2 is generally similar to FIG. 1 except that bearing counter 8 of FIG. 1 is replaced by two bearing counters 8a and 8b in FIG. 2 and a crossover detector 14 is connected between 8a and X deflection line 13. Bearing counter 8a furnishes a count to digital coincidence circuit 4 over line 5. Bearing counter 8b furnishes a 150 c.p.s. synchronizing pulse output on line 9 to spiral deflection generator 10. Crossover detector circuit 14 resets counter 8a over lead 23 each time the positive going X deflection voltage "crosses over" or passes through the level which corresponds to the 0° position of the electron beam of tube 12. Therefore, bearing counter 8a will begin a new count each time the X deflection voltage passes through the 0° level while increasing positively. Since digital coincidence circuit 4 receives one of its two inputs from counter 8a, the beam intensifying pulse output from 4 to tube 12 is necessarily referenced to the X deflection voltage from spiral deflection generator 10. Bearing counter 8b which furnishes a synchronizing output to deflection generator 10 counts simultaneously with bearing counter 8a because each counter receives the same count pulses from clock pulse source 6. Thus the above described circuitry effectively avoids the inaccuracy due to phase drift in the deflection generator which affected the prior art circuits. The block 16 in FIG. 2 represents a monostable multivibrator which is set over line 23a each time counter 8a is reset by crossover detector 14. Multivibrator 16 is adjusted to produce an output voltage for a period lasting until the X deflection voltage of generator 10 again becomes negative. This voltage is fed back over line 25 to clamp the output of crossover detector 14 for reasons which will become apparent in the following explanation of FIG. 3.

Figure 3:
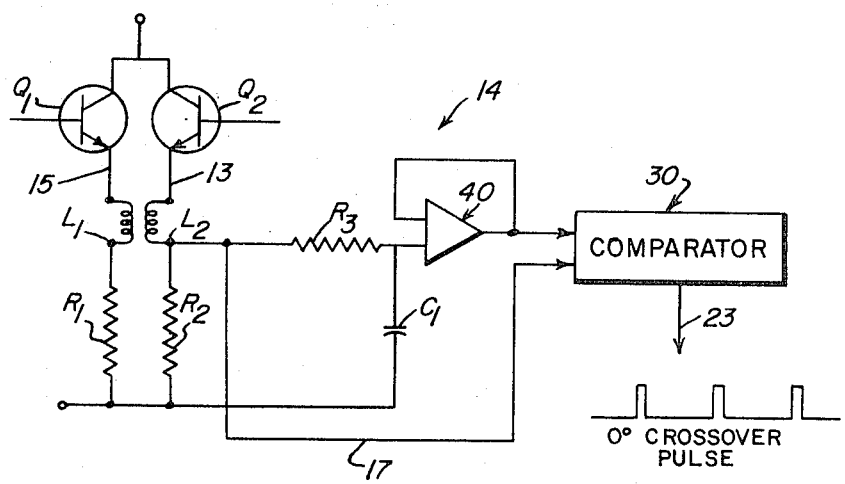
FIG. 3 is a partial circuit diagram of the invention.

Crossover detector 14 shown in more detail in FIG. 3 includes a resistor R2 connected in series with the X deflection winding L2 to receive the X deflection current furnished by an emitter follower Q2. The Y deflection current flows through a similar circuit comprising Q1, L1, and R1. The voltage developed across R2 is averaged by integrating circuit R3, C1, which furnishes an output to amplifier 40. Amplifier 40 furnishes a DC output voltage which is the average of the varying voltage across R2. This DC voltage is applied as a reference to one input of a comparator 30. A second input to comparator 30 is connected directly to the top of R2 by line 17 to receive the varying X deflection voltages developed across R2. Voltage variations at R2 are proportional to the X deflection current variations through L2. The emitter follower Q2 permits the comparator to use current from the DC reference without disturbing its voltage. Each time the varying voltage developed across R2 passes through or "crosses over" the DC reference voltage level while increasing positively, comparator 30 produces an output pulse over output line 23 which is used to reset counter 8a and to set monostable multivibrator 16 as described above. The DC reference voltage represents the level which positions the electron beam of tube 12 at the 0° position.

Figure 4:
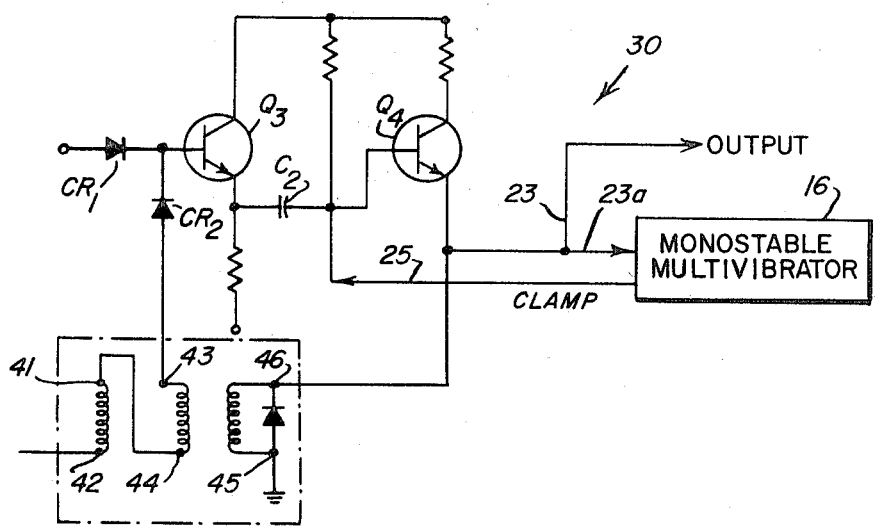
FIG. 4 shows a circuit for the comparator shown in block form in FIG. 3.

The circuit of comparator 30 shown in detail in FIG. 4 includes an input diode CR1 to which is connected the DC reference voltage from amplifier 40 of FIG. 3. This voltage is applied to the base of an emitter follower Q3. The X deflection voltage developed across R2 from lead 17 of FIG. 3 is applied to a terminal 42 of a transformer T. When the X deflection voltage is negative with respect to the DC reference, no current flows through diode CR2 and the base voltage of Q3 is equal to the DC reference voltage less the forward voltage drop of CR1. The comparator circuit is stable with a small current flowing through transformer T from terminal 46 to terminal 45 because an emitter follower Q4 is partially turned on. As the X deflection voltage at terminal 42 cycles through the zero level increasing in a positive direction diode CR2 begins to conduct raising the emitter potential of Q3. This positive going voltage is coupled through a capacitor C2 through emitter follower Q4 to terminal 46 of transformer T. The windings of transformer T are such that this induces a stepped up voltage at terminal 43 with the same polarity as the voltage at terminal 46. It may be seen that the circuitry of FIG. 4 so far described comprises a regenerative loop which produces a rapidly increasing current from terminal 46 to terminal 45 which continues to increase until the saturable core of transformer T saturates, thereby ending the step up coupling with terminal 43. This produces an output pulse at the emitter of Q4 which is coupled over lead 23 to reset bearing counter 8a of FIG. 2. The magnitude and duration of this output pulse will be determined to a large extent by the particular transformer selected. However, the above described regenerative action will continue to repeat as long as the X deflection voltage at terminal 42 remains positive with respect to the DC reference voltage. Therefore the output pulse at lead 23 is also applied over lead 23a to set monostable multivibrator 16 which feeds back a voltage over lead 25 to clamp the comparator circuit until the X deflection voltage goes negative again as described above.

It should be understood that many modifications and variations of the invention will become apparent to those skilled in the art from the above disclosure. It is therefore desired that the invention should not be limited to the exemplary embodiment described above but only by the following claims.

What is claimed is:

1. In apparatus for synchronizing separate circuits, the improvement comprising:
  means for referencing a digital coincidence circuit to a spiral deflection generator, said means comprising a crossover detector circuit and connecting means between said spiral deflection generator and said cross-over detector and connecting means between said crossover detector and said digital coincidence circuit, said connecting means between said spiral deflection generator and said crossover detector being connected to enable said crossover detector to forward an output pulse to said connecting means between said crossover detector and said digital coincidence circuit in response to a voltage in said spiral deflection generator.

2. The apparatus of claim 1 wherein the said crossover detector circuit comprises an integrating circuit connected to average a deflection voltage from said spiral deflection generator and a comparator connected to receive said average deflection voltage at a first input terminal and said deflection voltage at a second input terminal.

3. The apparatus of claim 2 wherein said comparator produces an output pulse when said deflection voltage crosses over said averaged deflection voltage while increasing in a positive direction.

4. The apparatus of claim 3 wherein said comparator output pulse is connected to reset a first bearing counter which is connected to control said digital coincidence circuit.

5. The apparatus of claim 4 wherein the said comparator output pulse is connected to set a monostable multivibrator.

6. The apparatus of claim 5 wherein said monostable multivibrator is connected to feedback a clamping voltage to clamp said crossover detector circuit for a predetermined period.

7. The apparatus of claim 6 wherein said deflection generator is connected to receive a synchronizing pulse output voltage from a second bearing counter, said second bearing counter and said first bearing counter being connected to receive a clock pulse output from a common clock pulse source.

8. The apparatus of claim 7 wherein a target bearing register is connected to furnish a second control input to said digital coincidence circuit.

9. The apparatus of claim 8 wherein said digital coincidence circuit is connected to furnish a beam intensifying pulse to a cathode ray tube display when the outputs of said target bearing register and said first bearing counter are digitally coincident, and said deflection generator is connected to furnish deflection voltages to said cathode ray tube display.

References Cited

UNITED STATES PATENTS 3,218,560 11/1965 Peters _____ 328—72 X
3,304,504 2/1967 Horlander _____ 328—74 X RICHARD A. FARLEY, *Primary Examiner.*

CHARLES L. WHITMAN, *Assistant Examiner.*